(12) United States Patent
Low

(10) Patent No.: US 9,282,386 B2
(45) Date of Patent: Mar. 8, 2016

(54) SPEAKER ENCLOSURE

(75) Inventor: Kok Chean Low, Singapore (SG)

(73) Assignee: ELECTRO ACOUSTICS RESEARCH (1999) PTE LTD, Singapore (SG)

(*) Notice: Subject to any disclaimer, the term of this patent is extended or adjusted under 35 U.S.C. 154(b) by 0 days.

(21) Appl. No.: 14/384,361

(22) PCT Filed: May 31, 2012

(86) PCT No.: PCT/SG2012/000194
§ 371 (c)(1),
(2), (4) Date: Sep. 10, 2014

(87) PCT Pub. No.: WO2013/137821
PCT Pub. Date: Sep. 19, 2013

(65) Prior Publication Data
US 2015/0027804 A1     Jan. 29, 2015

(30) Foreign Application Priority Data
Mar. 12, 2012 (SG) .............................. 201201757-0

(51) Int. Cl.
*H04R 1/02* (2006.01)
*H04R 31/00* (2006.01)
(Continued)

(52) U.S. Cl.
CPC . *H04R 1/02* (2013.01); *B23P 11/00* (2013.01); *H04R 1/2888* (2013.01); *H04R 31/00* (2013.01); *H04R 1/288* (2013.01); *Y10T 29/49826* (2015.01)

(58) Field of Classification Search
CPC .................................. H04R 1/02; A47B 81/06

USPC ................................................... 181/198, 199
See application file for complete search history.

(56) References Cited

U.S. PATENT DOCUMENTS

| | | | | |
|---|---|---|---|---|
| 3,804,195 | A * | 4/1974 | Everitt et al. ................. | 181/148 |
| 3,941,207 | A * | 3/1976 | Croup ........................... | 181/199 |
| 4,122,911 | A * | 10/1978 | Croup ........................... | 181/199 |

(Continued)

FOREIGN PATENT DOCUMENTS

WO        2002/082855 A2     10/2002

OTHER PUBLICATIONS

Peris, Karel, International Preliminary Report on Patentability, PCT/SG2012/000194, European Patent Office, Date of Completion of Report: Jan. 31, 2014.

(Continued)

*Primary Examiner* — Forrest M Phillips
(74) *Attorney, Agent, or Firm* — Gregory P. Einhorn; Greer Burns & Crain Ltd.

(57) ABSTRACT

A loud speaker enclosure and a method of forming the loudspeaker enclosure comprising the following steps: combining a first layer of a sheet material, a middle layer of a cored configuration and a second layer of the sheet material by using adhesive to form a panel; laminating a sheet of resilient material on the panel; forming a plurality of grooves extending partially through the depth of the panel, each of the grooves extending transverse to the panel such that the panel can be folded at the groove to form an enclosed main body; bending the panel at the location of the grooves to form the enclosed main body; capping the enclosed main body with a top wall and a bottom wall with separate panels wherein the main body, the top wall and the bottom wall defines the interior volume of the enclosure.

18 Claims, 8 Drawing Sheets

(51) Int. Cl.
*B23P 11/00* (2006.01)
*H04R 1/28* (2006.01)

(56) References Cited

U.S. PATENT DOCUMENTS

| | | | | |
|---|---|---|---|---|
| 4,811,403 | A | * | 3/1989 | Henricksen et al. ............ 381/87 |
| 5,519,178 | A | | 5/1996 | Ritto et al. |
| 5,929,393 | A | * | 7/1999 | Jeter, Jr. ....................... 181/199 |
| 6,913,110 | B1 | * | 7/2005 | Ritto ............................. 181/199 |
| 8,315,417 | B2 | * | 11/2012 | Basore .......................... 381/345 |
| 2008/0006477 | A1 | * | 1/2008 | Huang ........................... 181/199 |
| 2008/0302595 | A1 | * | 12/2008 | Moore ........................... 181/199 |
| 2010/0163335 | A1 | * | 7/2010 | Jiang ............................. 181/199 |

OTHER PUBLICATIONS

Peris, Karel, International Search Report, PCT/SG2012/000194, European Patent Office, Date of Mailing: Oct. 30, 2012.
Peris, Karel, Written Opinion, PCT/SG2012/000194, European Patent Office, Date of Mailing: Oct. 30, 2012.

* cited by examiner

SPEAKER ENCLOSURE

CROSS-REFERENCE TO RELATED APPLICATIONS

This United States utility patent application is the §371 national phase of PCT international patent application no. PCT/SG2012/000194, having an international filing date of May 31, 2012, which claims benefit of priority to Singapore Patent Application Ser. No. 60/939,019, filed Mar. 12, 2012. The aforementioned applications are expressly incorporated herein by reference in their entirety and for all purposes.

FIELD OF THE INVENTION

The present invention relates to an improved speaker enclosure. In particular, it relates to a speaker enclosure for producing improved sound performance.

BACKGROUND OF THE INVENTION

Conventionally, speaker enclosures are typically made of wood material having a rectangular shape. The range of speaker enclosures in the market are varied and are used for applications ranging from home use to professional use, including but not limited to outdoor performances.

Typically, the speaker enclosures used for professional use are generally large and heavy. The weight and bulk of the speaker enclosures make transportation and movement difficult. Apart from the weight, the materials used for speaker enclosures affect the sound performance of the speaker by absorbing vibrations. Speaker enclosures made of different material such as plywood, birch or Medium-Density Fibreboard ("MDF") have different degree of effectiveness in absorbing undesirable vibrations. Such damping materials have been used internal of the speaker enclosures to reduce undesirable vibrations.

The panels for forming the speaker enclosure prevent sound waves generated by the rearward facing speaker driver interacting with sound waves generated at the front of the speaker driver, such forward and rearward-generated sound waves are out of phase with each other, any interaction between the two sound waves in the listening space creates distortion of the original sound waves as they were intended to be reproduced. It thus avoids internal standing sound waves. Such panels help to prevent distortion of the sound produced by the speakers and prevent the magnification of unwanted frequencies causing undesirable effects when sound is of a high frequency. It further enhances the quality of sound when it is of mid-frequency.

One way of addressing the above problems can be found in U.S. Pat. No. 3,804,195, which discloses a loudspeaker enclosure made out of corrugated sheets of material. The corrugated sheets of material include hollow portions. Each of these sheets is joined together in a box-like configuration. Another example can be found in U.S. Pat. No. 4,811,403 which discloses a lightweight loudspeaker enclosure that uses a rigid lightweight honeycombed material in part of the speaker enclosure.

While weight and improved sound performances resulted from the constructions of speaker enclosures found in the above patents, vibrations still remained due to seams joining each of the pieces of the enclosure. Vibrations are induced at the seams and joints reducing overall sound performance of the speakers.

To address this problem, U.S. Pat. No. 5,519,178 discloses a speaker enclosure having a substantially seamless rigid outer skin, a middle sound absorbing layer, and a substantially seamless flexible skin. The outer skin is formed from multiple layers of resin impregnated carbon fiber, the middle sound absorbing layer includes pieces of honeycomb material and the inner layer is formed from multiple layers of resin impregnated fiberglass. The layers of material are arranged in a substantially seamless manner into a mold and then cured by vacuum bagging and heating thereby producing a strong, lightweight speaker enclosure capable of producing overall good quality sound. However, due to the methods used to manufacture the enclosure, the manufacturing method requires precise quality control leading to high manufacturing costs.

There is therefore a need for a durable, light weight speaker enclosure capable of minimizing distortion of sound signals but yet relatively easy and inexpensive to manufacture.

Any discussion of documents, devices, acts or knowledge in this specification is included to explain the context of the invention. It should not be taken as an admission that any of the material forms a part of the state of the art or the common general knowledge in the relevant art in Singapore or elsewhere on or before the priority date of the disclosure and claims herein. All statements as to the date or representation as to the contents of these documents is based on the information available to the applicant and does not constitute any admission as to the correctness of the date or contents of these documents.

OBJECT OF THE INVENTION

It is an object of the present invention to overcome, or at least substantially ameliorate, the disadvantages and shortcomings of the prior art.

Other objects and advantages of the present invention will become apparent from the following description, taken in connection with the accompanying drawings, wherein, by way of illustration and example, an embodiment of the present invention is disclosed.

SUMMARY OF THE INVENTION

According to a first aspect of the present invention, there is provided a loud speaker enclosure comprising a casing having a main body and a cap at each end of the main body to define the interior volume of the enclosure, the main body having a plurality of side walls, the side walls including a first layer, a middle layer and a second layer to form a panel, wherein the plurality of side walls are formed from a single panel for folding to form the main body of the enclosure.

In a preferred embodiment, a resilient material is laminated on the first layer which faces the interior volume of the enclosure.

In another preferred embodiment, the panel comprises a plurality of slit joints wherein each slit joint extends transversely across the panel for forming a fold.

Preferably, the slit joint is a groove extending at least partially through the depth of the panel.

Preferably, the groove has a V-shaped profile.

In a preferred embodiment, the groove has a L-shaped profile.

Preferably, the middle layer is a honeycomb configuration made of metal.

Preferably, the first layer and the second layer is a metal material, combination of carbon fibre, fibre glass, polypropylene or foam material.

Preferably, the first layer and second layer is aluminium.

Preferably, the plurality of side walls is of a curved configuration.

According to a second aspect of the present invention, there is provided a method of forming a loudspeaker enclosure comprising the following steps:
- a) Combining a first layer of a sheet material, a middle layer of a cored configuration and a second layer of the sheet material by using adhesive to form a panel;
- b) Laminating a sheet of resilient material on the panel;
- c) Forming a plurality of grooves extending partially through the depth of the panel, each of the grooves extending transverse to the panel such that the panel can be folded at the groove to form an enclosed main body;
- d) Bending the panel at the location of the grooves to form the enclosed main body;
- e) Capping the enclosed main body with a top wall and a bottom wall with separate panels wherein the main body, the top wall and the bottom wall defines the interior volume of the enclosure.

In a preferred embodiment, forming the plurality of grooves comprises cutting at least partially through the depth of the panel.

In yet another preferred embodiment, each of the plurality of grooves has a V shaped profile.

Preferably, each of the plurality of grooves has a L shaped profile.

Preferably, the method comprises a further step of using adhesive to adhere the plurality of grooves to the panel.

Preferably, the method comprising a further step of heat treating the panel to adhere plurality of grooves to the panel.

Preferably, the first layer and second layer are made of metal, combination of carbon fibre, fibre glass, polypropylene or foam.

Preferably, the first and second layer is made of aluminium.

Preferably, the cored configuration includes a honeycomb arrangement.

In a preferred embodiment, the cored configuration includes a corrugated arrangement.

In a preferred embodiment, the cored configuration includes a fluted arrangement.

In a preferred embodiment, the cored configuration is made of foam.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF DRAWINGS

In order that the invention may be better understood and put into practical effect, the invention will now be described, by way of example only, with reference to the accompanying drawings, in which.

DETAILED DESCRIPTION OF INVENTION

The present invention will now be described in detail in connection with preferred embodiments with reference to the accompanying drawings.

Figure 1:
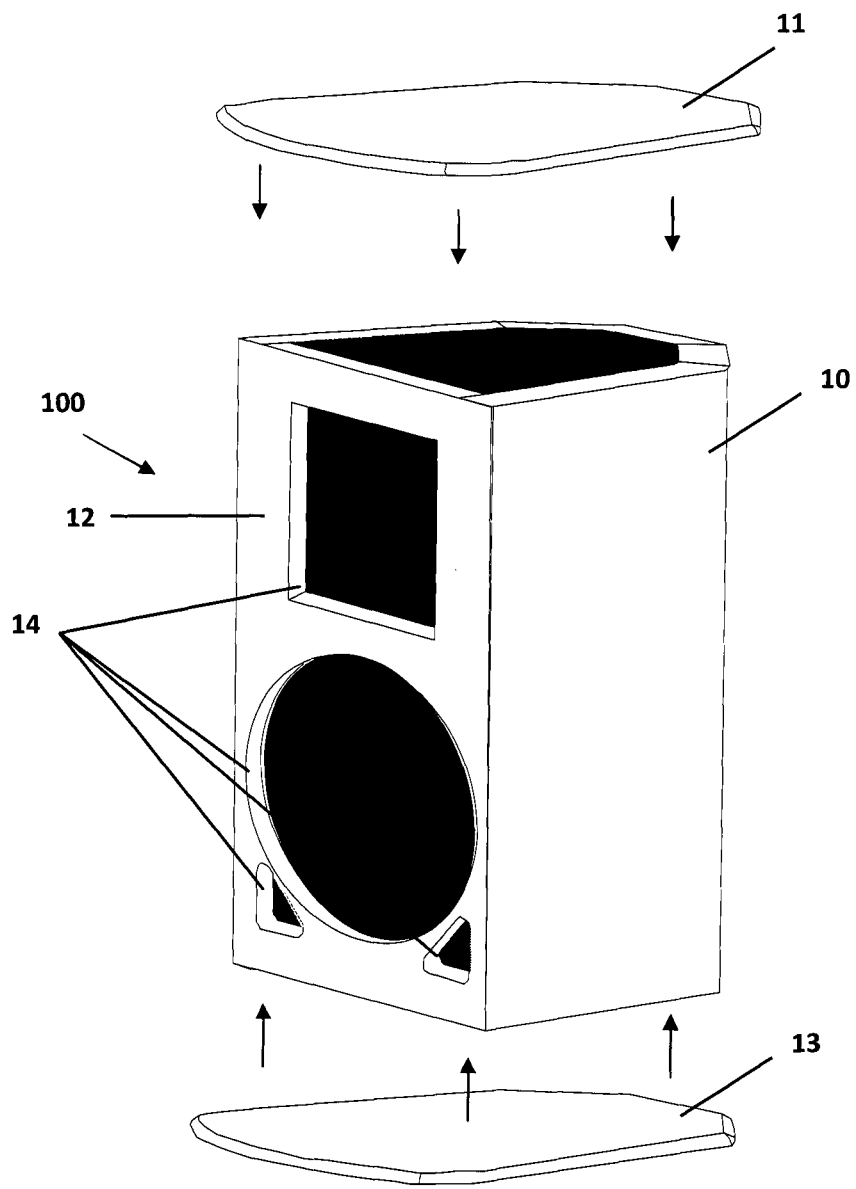
FIG. 1 is an exploded perspective view of a loudspeaker enclosure.

FIG. 1 illustrates a speaker enclosure 100 according to an embodiment of the present invention. The speaker enclosure 100 comprises three basic component parts, a main body 10, a top cap 11 and a bottom cap 13 for the main body 10 to define the casing for the speaker enclosure. The main body 10 defines an interior volume of space in which one or more speakers or tweeters, speaker drivers and associated electronic hardware, such as crossover circuits and amplifiers (all not shown) are mounted. In the embodiment shown in FIG. 1, the main body 10 is shown to have 6 side walls forming the main body. Alternatively, a rectangular shaped main body would be possible. The construction of the speaker enclosure 100 is therefore readily adaptable to various sizes and shapes and not limited to the exact enclosure shown in FIG. 1.

The baffle section 12 comprises one of the side walls of the main body. The baffle section 12 includes one or more openings 14 where the speakers (not shown) are mounted within the enclosure such that the diaphragm portions of the speakers communicate through the openings 14 to the outside of the speaker enclosure.

The top cap 11 and the bottom cap 13 are dimensioned and cut to shape to fit the top and bottom of the side walls, of the main body. The top cap 11 and the bottom cap 13 may be formed of a panel of the same construction as that used for the main body 10.

Figure 2A:
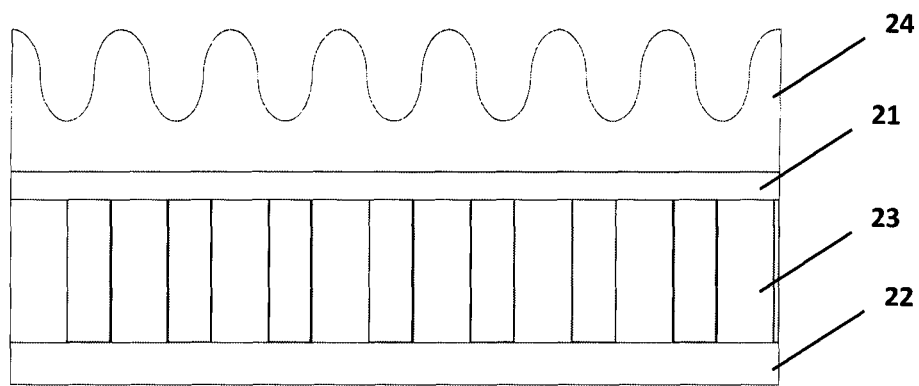
FIG. 2a is a cross-sectional view of a panel for forming the loudspeaker enclosure.
Figure 2B:
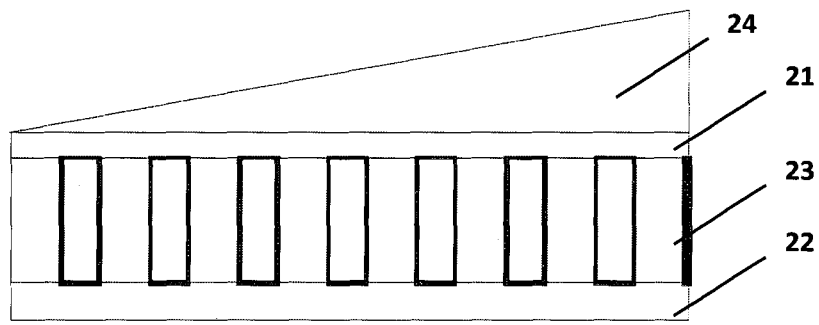
FIG. 2b is a cross-sectional view of an alternative panel for forming the loudspeaker enclosure.
Figure 2C:
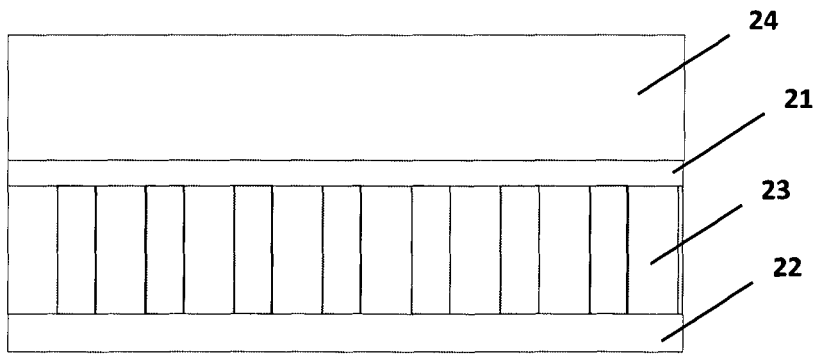
FIG. 2c is a cross-sectional view of another alternative panel for forming the loudspeaker enclosure.

FIG. 2 illustrates a partial cross-sectional view of a cut away portion of the main body 10. The main body 10 of the enclosure comprises of four main layers. A first layer 21 and a second layer 22, both comprising sheets of a material made of metal, are spaced apart to provide for a middle layer 23 of general core configuration, the configuration of which will be explained in detail later. In a preferred embodiment, the sheets of material and the core configuration are made of aluminium. Alternatively, the sheets of material and the core configuration may be made of a combination of carbon fibre, fibre glass, polypropylene, or foam. A flexible sheet of resilient material 24 combines with either the first or second layers by adhesive means. In a preferred embodiment, the resilient material 24 may be made of rubber. Different configurations of resilient material may be possible. FIG. 2a shows a sheet of resilient material 24 of a corrugated configuration. FIG. 2b shows a relatively thin tapering sheet of resilient material 24 while FIG. 2c shows a relatively thick and flat sheet of resilient material. The resilient material 24 is located within the interior volume of the speaker enclosure 100. The resilient material 24 acts as a dampener and combines with the 3 layers to prevent sound waves generated by the rearward facing speaker driver interacting with sound waves generated at the front of the speaker driver, such forward and rearward-generated sound waves are out of phase with each other, any interaction between the two sound waves in the listening space creates distortion of the original sound waves as they were intended to be reproduced. It thus avoids internal standing sound waves. They help to prevent distortion of the sound produced by the speakers and prevent the magnification of unwanted frequencies causing undesirable effects when sound is of a high frequency. It further enhances the quality of sound when it is of mid-frequency. The plurality of air pockets within the material of the middle layer 23 also serve to reduce the vibration of the second layer 22. This middle layer further serves to isolate sound from transmitting from the interior space of the speaker enclosure to the outside of the speaker enclosure.

FIGS. 3a, 3b, 3c and 3d illustrate middle layers of different core configurations 25, 26, 27 and 28 for the construction of the panel. The middle layer generally comprises a material having a plurality of air pockets located within. The middle layer and the resilient material 24 act as dampener, at the same time, they prevent sound waves generated by the rearward facing speaker driver interacting with sound waves generated at the front of the speaker driver, such forward and rearward-generated sound waves are out of phase with each other, any interaction between the two sound waves in the listening space creates distortion of the original sound waves as they were intended to be reproduced. It thus avoids internal standing sound waves. Such panels help to prevent distortion of the sound produced by the speakers and prevent the magnification of unwanted frequencies causing undesirable effects when sound is of a high frequency. It further enhances the quality of sound when it is of mid-frequency. The plurality of air pockets within the material of the middle layer 23 also serve to reduce the vibration of the second layer 22. This middle layer 23 further serves to isolate sound from transmitting from the interior space of the speaker enclosure to the outside of the speaker enclosure.

Figure 3A:
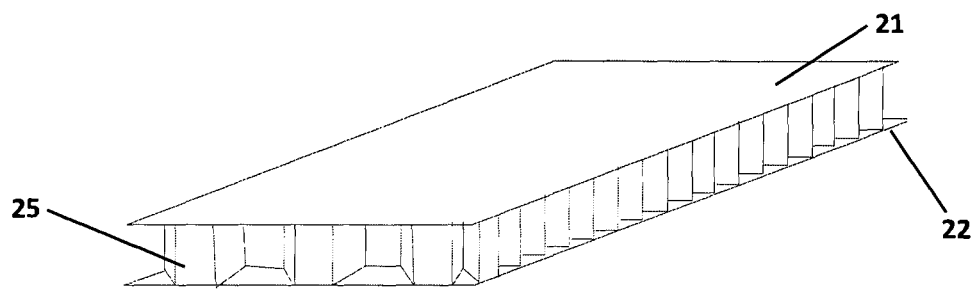
FIG. 3a is a cross-sectional perspective view of a panel having a middle layer which has honeycomb arrangement.
Figure 3B:
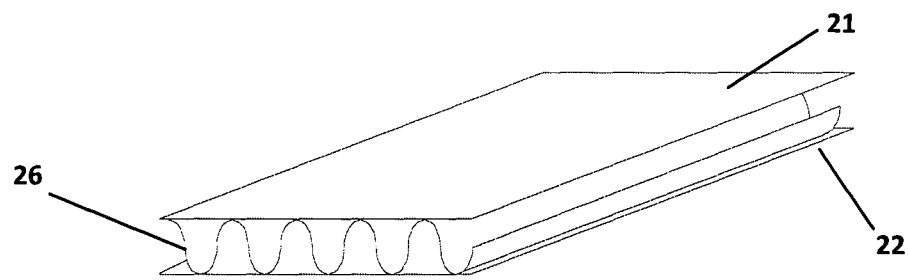
FIG. 3b is a cross-sectional perspective view of a panel having a middle layer which is corrugated.
Figure 3C:
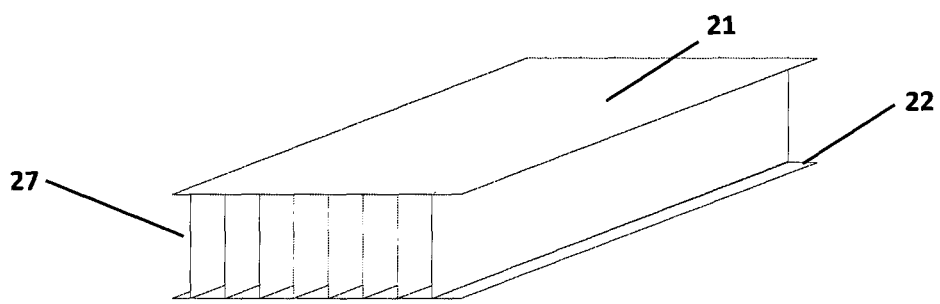
FIG. 3c is a cross-sectional perspective view of a panel having a middle layer which is fluted.
Figure 3D:
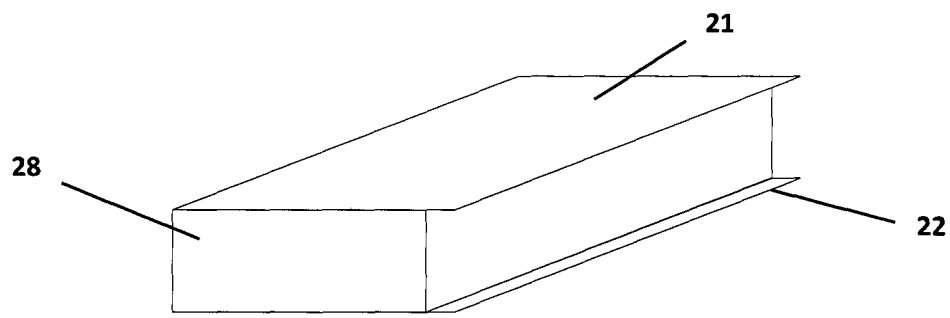
FIG. 3d is a cross-sectional perspective view of a panel having a middle layer which is made of foam.

FIG. 3a illustrates a middle layer having a honeycomb arrangement 25. FIG. 3b shows a middle layer having a corrugated core configuration 26. FIG. 3c shows a middle layer having a fluted configuration 27 while FIG. 3d shows a middle layer using foam core 28 which serves as an effective dampener. As mentioned above, the core configuration may be made of metal, a combination of carbon fibre, fibre glass, polypropylene, or foam. In a preferred embodiment, the core configuration is made of aluminium. The construction of the core configuration is therefore readily adaptable to various configurations and not limited to the shown in FIGS. 3a, 3b, 3c and 3d.

Figure 4:
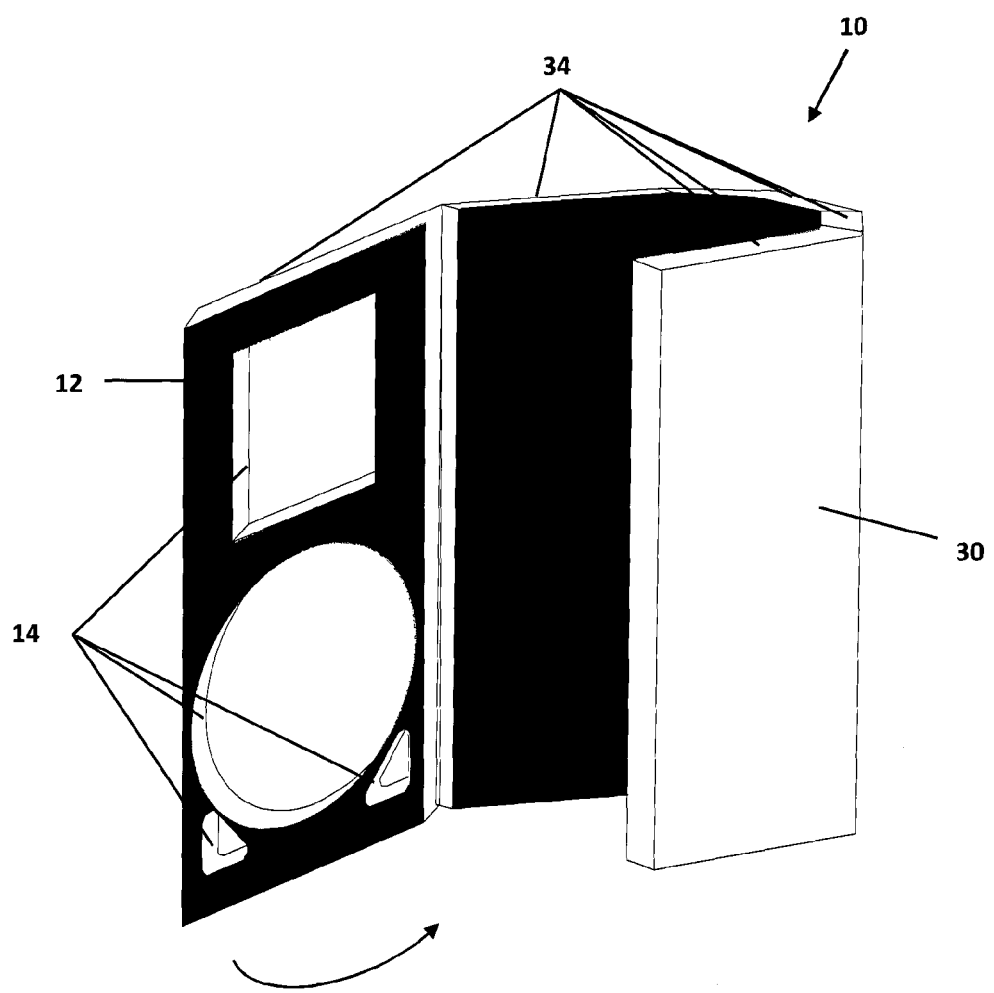
FIG. 4 is an exploded perspective view of the layers of a panel for forming a loudspeaker enclosure.

FIG. 4 illustrates a perspective view of how the main body 10 of the speaker enclosure is formed from a single panel 30. The single panel 30 is constructed from combining the first layer, second layer and the middle layer using adhesive to combine the layers together. A single sheet of resilient material with the same dimensions as the panel 30 can be laminated over the first or second layer. The resilient material will define the interior volume of the enclosure. Forming the main body 10 from a single panel provides significant advantages. Firstly, the external part of the main body 10 of the speaker enclosure appears to be seamless. This design improves the quality of the sound produced from the speaker by reducing the painful effects of the high frequencies while making the mid frequencies more pronounced. It also minimizes internal standing waves. Secondly, costs of manufacturing such a speaker enclosure are lowered significantly due to the ease of constructing the main body 10, the method of which will be explained hereinafter. FIG. 4 shows the panel 30 being folded to form side walls 34 of the enclosure with a side wall of one end of the panel joining the side wall at the opposing end of the panel to define the interior space of the speaker enclosure. One of the side walls 34 may include openings 14 to form the baffle section 12 for allowing the speaker mounted within the enclosure so that the diaphragm portions of the speakers can communicate through the openings 14 to the outside of the speaker enclosure.

Figure 5:
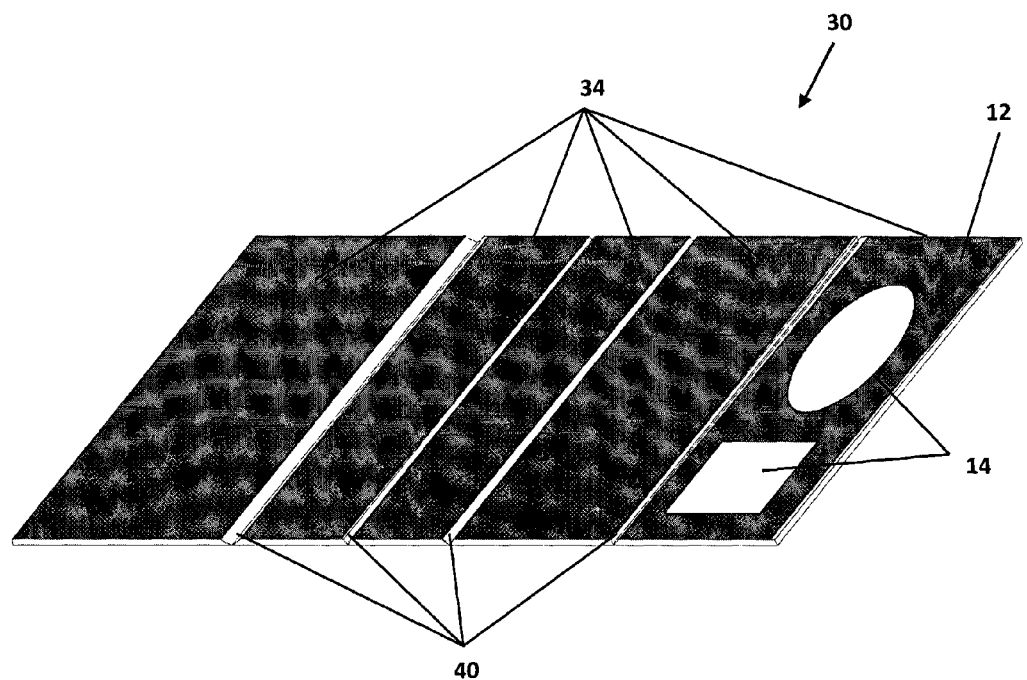
FIG. 5 is a perspective view of the panel indicating the slots formed at various locations on the depth of the panel.

FIG. 5 illustrates the single panel 30 flat on a surface (not shown) before being folded to form the main body 10 of the speaker enclosure. Once the panel 30 is formed from the four layers, a groove or slot 40 is formed at the part where the panel can be folded. The groove 40 is made by cutting partially through the depth of the panel 30 such that the panel will not be severed into separate parts. The cut may be made by a Computer Numerical Control (CNC) machine where precision cutting is possible. It is envisaged that many possible shapes of speaker enclosures can be formed by forming grooves 40 across the width of the panel 30. For example, a main body having a rectangular or square profile would require 3 grooves to form 3 foldable regions for folding into a main body.

Figure 6:
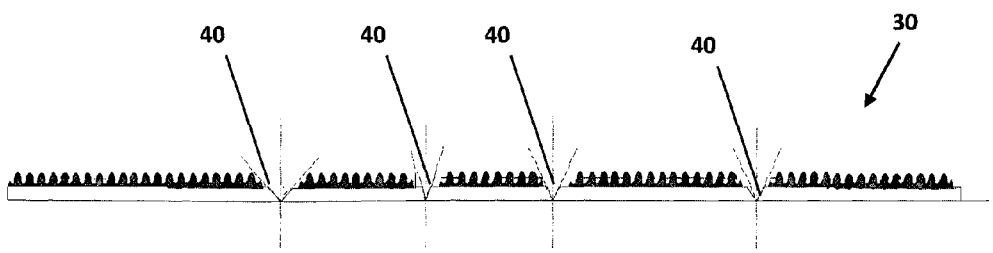
FIG. 6 is cross-sectional view of the panel indicating the different types of slots formed on the depth of the panel.

FIG. 6 illustrates a cross sectional view of the panel 30 and the grooves 40 made along the panel for folding. For the purposes of folding to form the speaker enclosure, two types of grooves can be made through the depth of the panel. The first is a cut having a V-shaped profile. The second is a cut having a L-shaped profile. Typically, the type of groove to be formed depends on the degree of foldability required at the folding region. The greater the degree of foldability required to bend the side walls 34 into an enclosure, the more the groove will need to adopt a L-shaped profile.

Figure 7:
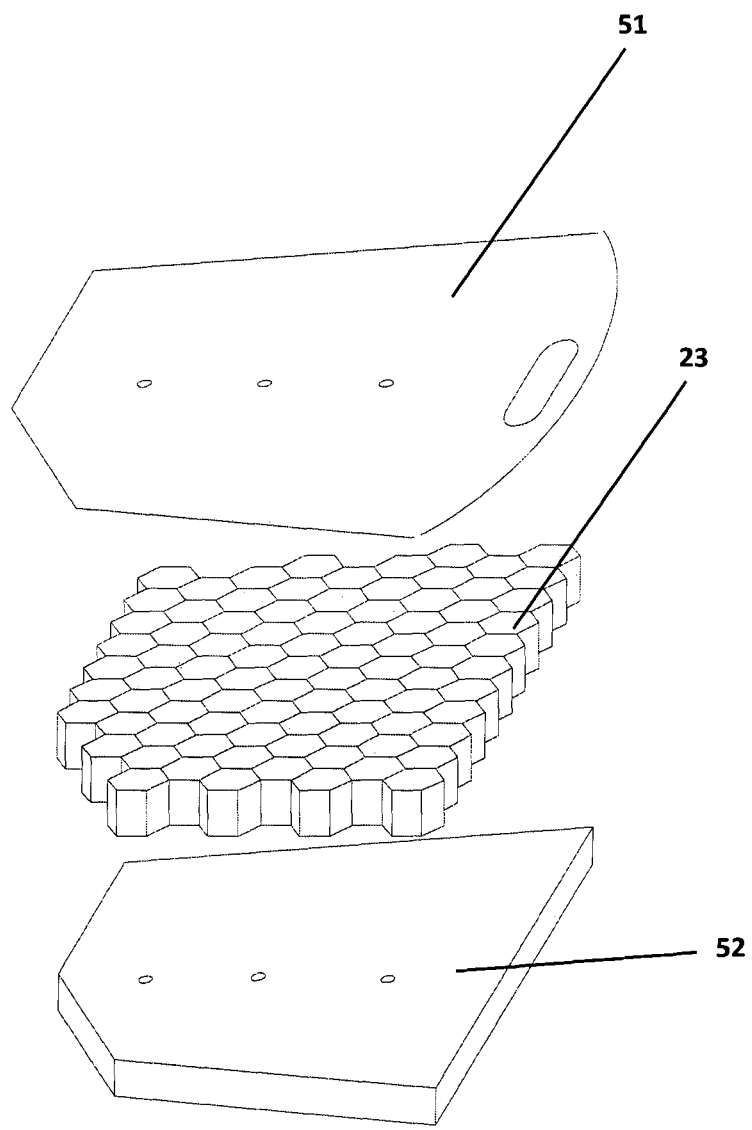
FIG. 7 is a perspective view of the top and bottom caps of the main body sandwiching a middle layer of a honeycomb arrangement.

FIG. 7 illustrates the method of forming the top and bottom caps of the main body in order to close the ends of the main body to define the interior volume of the speaker enclosure. A sheet of material 51, preferably aluminium is cut to shape corresponding to the cross section profile of the main body. A plurality of openings is drilled into the sheet for mounting purposes. A similar sheet of material 52, preferably also aluminium, is cut to shape corresponding to the cross section profile of the main body. Holes are similarly drilled into the sheet of material. A middle layer 23 having a cored configuration, as mentioned above, is then adhered together with the two sheets of materials 51, 52 to form the top and bottom caps of the main body.

Figure 8:
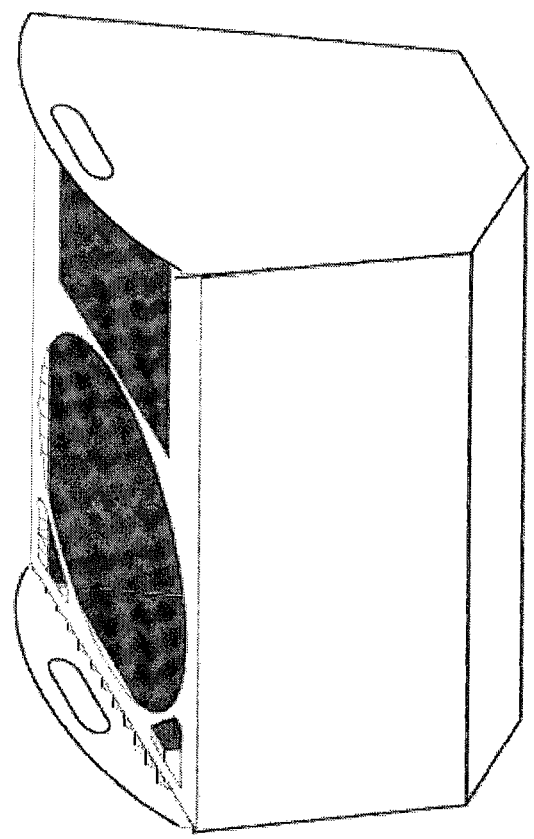
FIG. 8 is a perspective view of the loudspeaker enclosure in its final assembled form.

FIG. 8 illustrates the speaker enclosure 100 in its final assembled form.

Figure 9:
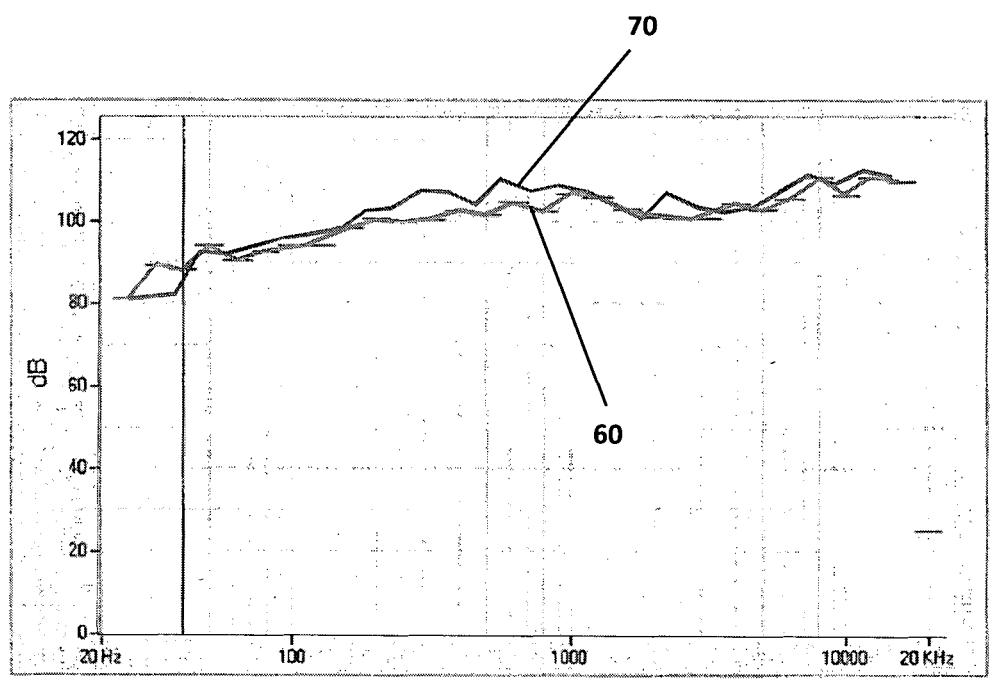
FIG. 9 is a graph of decibels versus kilohertz comparing the quality of sound produced by a loudspeaker of the present invention and a conventional high end speaker.

FIG. 9 illustrates the graphical result of sound tests conducted on two speaker enclosures of similar dimensions, one a preferred embodiment of the present invention and a conventional speaker enclosure commercially available in the market. The conventional speaker is a Fohhn AT22 10" 2 way speaker system. The result presented in the graph of decibels versus kilohertz compares the quality of sound produced by a loudspeaker enclosure of a preferred embodiment 60 and the conventional high end speaker 70. The result shows that at the same frequency, particularly at the higher frequencies, the sound from the preferred embodiment of the present invention 60 had a relatively lower decibel result. In use, the effect of this result to a listener would mean that at sound of higher frequencies, the painful effects would be reduced, leading to a more pleasant hearing sensation to the ears. Further, sounds of mid frequencies are also more linear in the preferred embodiment of the present invention leading to a more pleasant listening experience.

Although the invention has been herein shown and described in what is conceived to be the most practical and preferred embodiment, it is recognized that departures can be made within the scope of the invention, which is not to be limited to the details described herein but is to be accorded the full scope of the appended claims so as to embrace any and all equivalent devices and apparatus.

'Comprises/comprising' when used in this specification is taken to specify the presence of stated features, integers, steps or components but does not preclude the presence or addition of one or more other features, integers, steps, components or groups thereof.

The invention claimed is:

1. A loud speaker enclosure comprising:
   a casing having a main body and a cap at each end of the main body to define the interior volume of the enclosure, the main body having a plurality of side walls, the side walls including a first layer, a middle layer and a second layer to form a panel, wherein a resilient material is laminated on the first layer or second layer; and
   wherein the plurality of side walls are formed from a single panel for folding to form the main body of the enclosure;
   wherein the panel comprises a plurality of grooves wherein each groove extends transversely across the panel for forming a fold.

2. The loudspeaker enclosure according to claim 1, wherein a resilient material is laminated on the first layer which faces the interior volume of the enclosure.

3. The loudspeaker enclosure according to claim 2, wherein the groove has a V-shaped profile.

4. The loudspeaker enclosure according to claim 2, wherein the groove has a L-shaped profile.

5. The loudspeaker enclosure according to claim 1, wherein the middle layer is a honeycomb configuration made of or comprising a metal.

6. The loudspeaker enclosure according to claim 1, wherein the first layer and the second layer is or comprises a metal material, a carbon fibre, a fibre glass, a polypropylene, a foam, or a combination of any of a carbon fibre, fibre glass, polypropylene and foam material.

7. The loudspeaker enclosure according to claim 1, wherein the first layer and second layer is aluminium or comprises an aluminium.

8. The loudspeaker enclosure according to claim 1 wherein the plurality of side walls is of a curved configuration.

9. A method of forming a loudspeaker enclosure comprising the following steps:
   combining a first layer of a sheet material, a middle layer of a cored configuration and a second layer of the sheet material by using adhesive to form a panel;
   laminating a sheet of resilient material on the first layer or second layer;
   forming a plurality of grooves extending partially through the depth of the panel, each of the grooves extending transverse to the panel such that the panel can be folded at the groove to form an enclosed main body;
   bending the panel at the location of the grooves to form the enclosed main body; and
   capping the enclosed main body with a top wall and a bottom wall with separate panels wherein the main body, the top wall and the bottom wall defines the interior volume of the enclosure.

10. The method of claim 9, wherein forming the plurality of grooves comprises cutting at least partially through the depth of the panel.

11. The method of claim 10, wherein each of the plurality of grooves has a V shaped profile.

12. The method of claim 10, wherein each of the plurality of grooves has a L shaped profile.

13. The method of claim 9 further comprising the step of using adhesive to adhere the plurality of grooves to the panel.

14. The method of claim 9, further comprising the step of heat treating the panel to adhere plurality of grooves to the panel.

15. The method of claim 9, wherein the first layer and second layer is made of, or comprises, a carbon fibre, a fibre glass, a polypropylene, a foam, or a combination of any of a carbon fibre, fibre glass, polypropylene and foam.

16. The method of claim 15, wherein the first and second layer is made of, or comprises, a aluminium.

17. The method of claim 9, wherein the cored configuration includes a honeycomb arrangement, a
   corrugated arrangement, a fluted arrangement, or a combination thereof.

18. The method of claim 9, wherein the cored configuration is made of, or comprises, a foam.

* * * * *